OUTLINE PRODUCING APPARATUS FOR OBJECT DEFINITION

Filed Aug. 24, 1964 4 Sheets-Sheet 1

INVENTOR
HUGH J. SWEENEY

BY Wade Koontz
ATTORNEY
Eugene J. Pawlikowski
AGENT

OUTLINE PRODUCING APPARATUS FOR OBJECT DEFINITION

Filed Aug. 24, 1964 4 Sheets-Sheet 2

INVENTOR
HUGH J. SWEENEY

BY Wade Koontz
ATTORNEY
Eugene J. Pawlikowski
AGENT

Jan. 2, 1968 H. J. SWEENEY 3,361,872

OUTLINE PRODUCING APPARATUS FOR OBJECT DEFINITION

Filed Aug. 24, 1964 4 Sheets-Sheet 3

INVENTOR
HUGH J. SWEENEY

BY Wade Koontz
ATTORNEY
Eugene J. Pawlikowski and
AGENT

Jan. 2, 1968 H. J. SWEENEY 3,361,872

OUTLINE PRODUCING APPARATUS FOR OBJECT DEFINITION

Filed Aug. 24, 1964 4 Sheets-Sheet 4

INVENTOR
HUGH J. SWEENEY

BY Wade Koontz
ATTORNEY and
Eugene J. Pawlikowski
AGENT

United States Patent Office 3,361,872

Patented Jan. 2, 1968

3,361,872

OUTLINE PRODUCING APPARATUS FOR OBJECT DEFINITION

Hugh J. Sweeney, 94 Pond St., Westwood, Mass. 02090

Filed Aug. 24, 1964, Ser. No. 391,819
6 Claims. (Cl. 178—6)

ABSTRACT OF THE DISCLOSURE

Video signals are applied to two differential amplifiers and are compared therein with the signals passed through a delay line and delayed one picture element, one amplifier providing an output when the picture changes from light to dark and the other on a dark to light transition. Output signals below a predetermined level are prevented from reaching a utilization device, while signals representing a gradual change in the video signal exceeding said predetermined level are passed on to the device whereby an outline of the image or scene is obtained.

The invention described herein may be manufactured and used by or for the United States Government for governmental purposes without payment to me of any royalty thereon.

This invention relates to electrical apparatus for recognizing and/or identifying objects by reinstating the acquired signal intelligence as a distinctive outline characterizing the object.

A system of this type is particularly adapted to be used when it is sufficient to relate an object or character merely by its outline, the other superfluous details being ignored. As one example in scientific work, a means which would enhance the important features of a picture while eliminating other conspicuous details would be very useful. Applications for such selective viewing exist in the interpretation of medical X-rays and in automatic machine reading of printed material.

Furthermore, in numerous situations the amount of detail present greatly exceeds the information content of the picture. For example, the presence of an airplane in a specified search area can be determined from its silhouette. The accidents of its environment, such as the clouds, stars, or camouflage, amount to unnecessary detail. The ideal conditions for automatic as well as visual recognition are observation of pertinent characteristics at maximum contrast.

Accordingly, one object of the invention is to provide apparatus for converting signal intelligence into useful and easily readable visual presentations.

Another object of the invention is the provision of apparatus in which the output of a camera pickup tube recognizes gradual as well as intensive contrast differences between adjacent picture segments.

A further object of the invention is to provide apparatus which distinguishes between distinctive contrast boundaries of different intensity which may appear successively in the same scene.

Still a further object of the invention is the provision of a system which reproduces a recognizable outline of characters scanned along only one axis.

Yet a further object of the invention is the provision of apparatus which displays an object as an intensified outline of its perimeter.

To achieve the foregoing objects, the principal embodiment of the invention comprises means for analyzing the brightness gradients of a picture, such as a televised image, and for reducing the picture information into a gradient pattern suitable for recognition purposes. The "gradient pattern" as used herein is meant to denote an abrupt change in the amplitude of a video-frequency signal brought about by the difference of two amplitude levels corresponding to sudden changes in brightness by which the character, image, picture or the like is defined. As an example of the function of the preferred embodiment, the signal currents corresponding to a picture of a black circular disk placed on a white field would give rise to a cathode ray tube display of an annulus corresponding to the brightness gradient at the periphery of the disc.

A conventional scanning system continuously compares the brightness distribution of an image in a periodically repeated path covering the image area. The comparison is accomplished by slightly delaying that signal which indicates the instantaneous brightness of a picture segment. This delayed signal is then subtracted from the undelayed output of the scanning pattern which arises from the immediately following image point. Any signals from areas of the same brightness distribution are the same in magnitude from one signal to the next and these are eliminated or cancelled. An output pulse is produced each time the signal arising from the comparison process exceeds a predetermined value, thereby indicating a degree of contrast of sufficient sharpness to be detected. Biasing means are also included to either increase or reduce the sensitivity of the circuit to gradient patterns. With the signal corresponding to the past picture element acting as the reference, and the feature of varying the reference or bias between maximum and minimum values, minute contrast changes at low levels of picture strength are detected and displayed as readily as minute changes at higher levels of picture strength.

A complete understanding of the invention and an introduction to other objects and features not specifically mentioned may be had from the following description when read in conjunction with the accompanying drawings, wherein.

Figure 3:
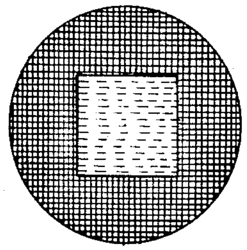
Figure 7:
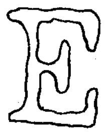
Figure 4:
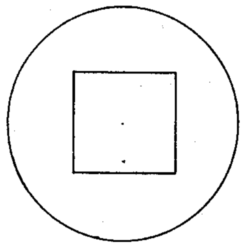
Figure 5:
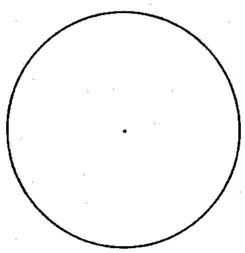
Figure 8:
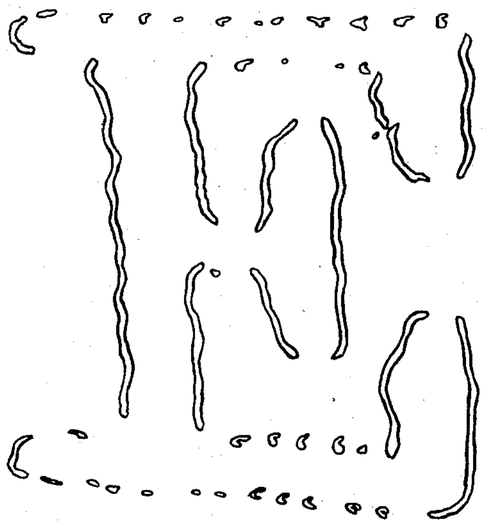
Figure 6:
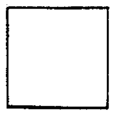
Figure 9:
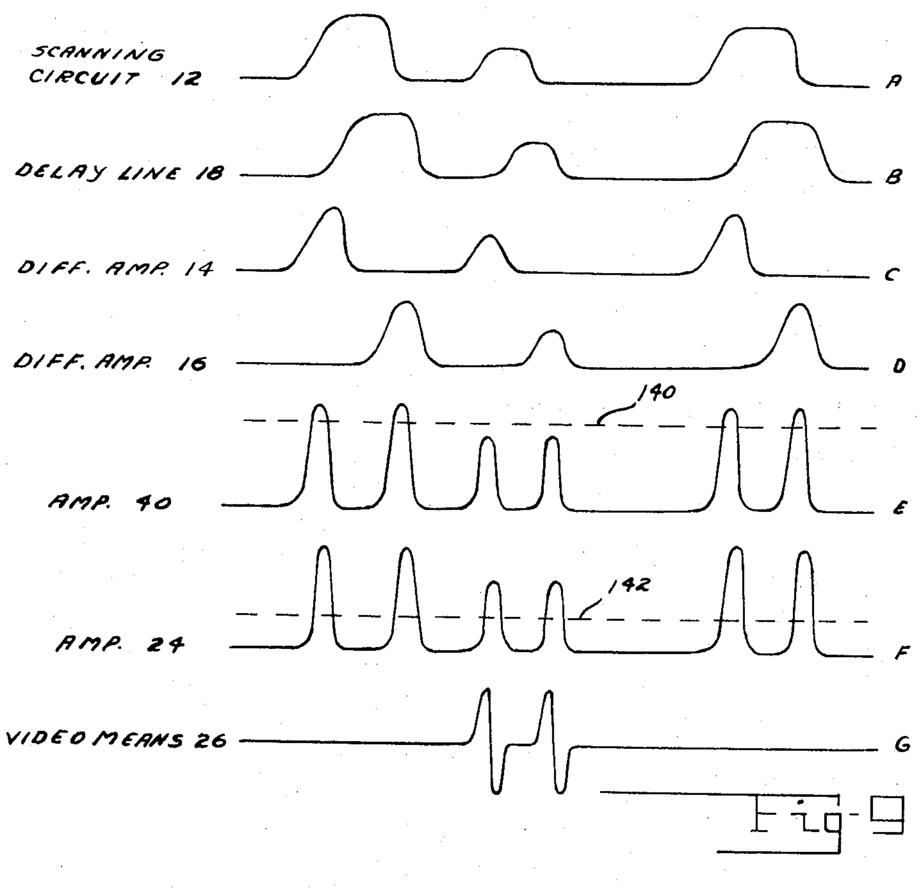
Figure 10:
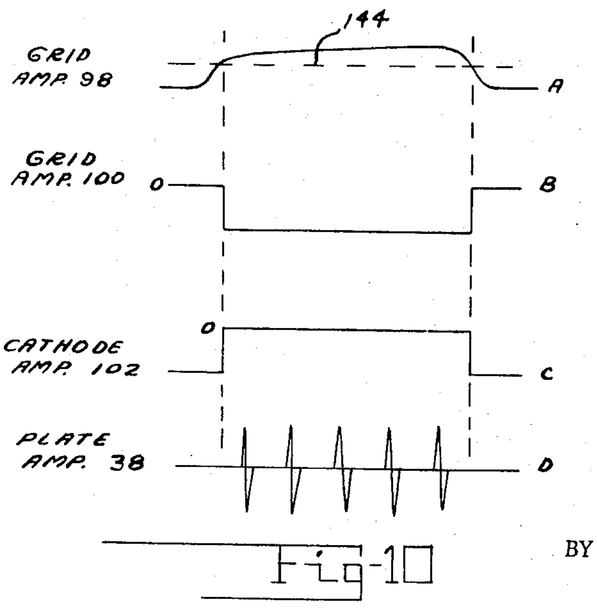

FIG. 3 presents an image field useful in illustrating the operation of the invention;

FIGS. 4, 5 and 6 are cathode-ray tube reproductions of contrast gradients produced from the pattern of FIG. 3;

FIG. 7 is a letter character;

FIG. 8 is a cathode-ray tube reproduction of the contrast gradient of the character of FIG. 7 while scanning only on the horizontal axis; and FIGS. 9 and 10 show certain waveforms produced by the preferred embodiment of the invention.

Figure 1:
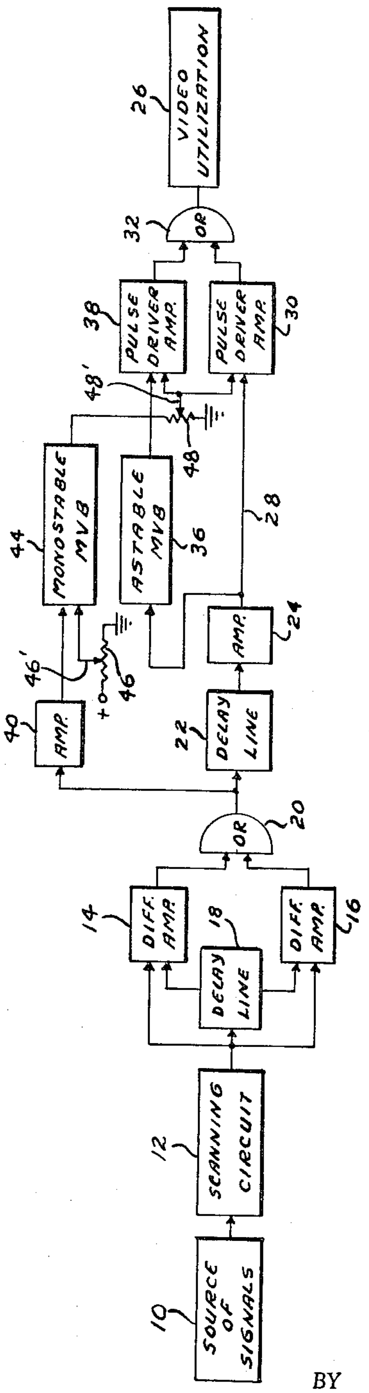
FIG. 1 is a schematic block diagram of the system of the present invention.

Referring now to FIG. 1, which illustrates the general arrangement of the invention, 10 represents a source of signals scanned by a scanning circuit 12 coupled to two differential amplifiers 14 and 16 and to a variable delay line 18. Following the delay between the entrance of the signal into the delay line and its emergence the double-ended input to the differential amplifiers is completed.

Source of signals 10 is not limited to a single configuration but may be of any suitable construction capable of reproduction in image form a scene, character, object or subject having characteristics which include regions producing radiation of different strength in the visible region of the spectrum. In an actual system, a source of signals 10 and associated scanning circuit 12 considered suitable for this purpose comprise the standard image orthicon television camera tube. Video signals from the point-to-point exploration by the spot beam and corresponding to the brightness of the scene thus form the output of scanning circuit 12.

Delay line 18 may be a standard quartz delay line. Difference amplifiers 14 and 16 are of the usual type and have a double-ended input circuit so connected as to respond to the difference between two input signals and effectively suppress those whose amplitudes are alike. Amplifiers 14 and 16 are connected to an OR function gate 20 whose characteristics are such that when either of its input circuits is energized an output signal is produced proportional to the input signal and with a polarity inversion.

From the output circuit of OR function gate 20, connections extend to a variable delay line 22 connected to an amplifier 24. The output of amplifier 24 is applied over two parallel paths, the video outputs of which are fed to a suitable video utilization means 26, such as a video amplifier strip, cathode ray tube display, or the like. The first or lower path includes a line 28 to a pulse driver amplifier 30 coupled to the video utilization device 26 by means of an OR function gate 32 of conventional construction.

The second or upper path includes an astable or free-running MVB 36 for developing oscillatory signals which, in turn, are applied to a pulse driver amplifier 38 likewise connected to OR gate 32.

The system in accordance with FIG. 1 further includes an inhibit signal producing channel. This channel may be considered to include an amplifier 40 connected to a monostable MVB 44 provided with a bias control shown herein, for example, as a variable resistor 46 connected to a unidirectional source indicated as (+). As is well known, each half of MVB 44 has a stable state which is reversed at random times depending on the input triggering pulses. The characteristics of MVB 44 in the illustrated embodiment are such that in the absence of image scanning the output terminal thereof is energized with a positive voltage. When triggered by an externally generated signal sufficient in magnitude to overcome the bias setting of wiper arm 46' of resistor 46. MVB 44 is triggered to the alternate condition whereby the voltage at its output terminal drops in a negative direction.

The output voltage of MVB 44 is impressed on a variable resistor 48 having its other end coupled to ground. The wiper arm 48' of resistor 48 is connected to pulse driver amplifiers 30 and 38 and the voltage therefrom constitutes an adjustable unidirectional bias which controls the response of the pulse driver amplifiers to the signals arising in either of the aforesaid two branches. Continuing with the general description, when MVB 44 is fired the level of the voltage appearing at the wiper arm of resistor 48 increases in the negative direction. This causes the pulse driver amplifiers to be inhibited against the signals produced at the output of amplifier 24. As a result, there will be no signal reproduction in video means 26. On the other hand, with MVB 44 biased in a way to oppose the influence of any signals passing out of amplifier 40, conditions at the wiper arm of resistor 48 may be established so as to permit actuation of the video means through one or the other of the pulse driver amplifiers.

The operation of the system illustrated in FIG. 1 is such that for all contrast gradients that are effectively sharply defined, the intensity pulse representing the gradient shelf will be reproduced in video means 26 by way of pulse driver amplifier 30. That is, provided that the pulse drivers are not inhibited by MVB 44 being triggered. On the other hand the astable MVB 36 in the other branch leading to pulse driver amplifier 38 exerts its influence only at times when signals are generated from an image whose surface brightness changes uniformly over the image area. During this latter scansion, MVB 36 accommodates itself to cause reproduction of the gradually-varying contrast gradient. In what follows, the detailed manner in which the two paths selectively operate to achieve a gradient pattern display will be taken up in turn.

Figure 2:
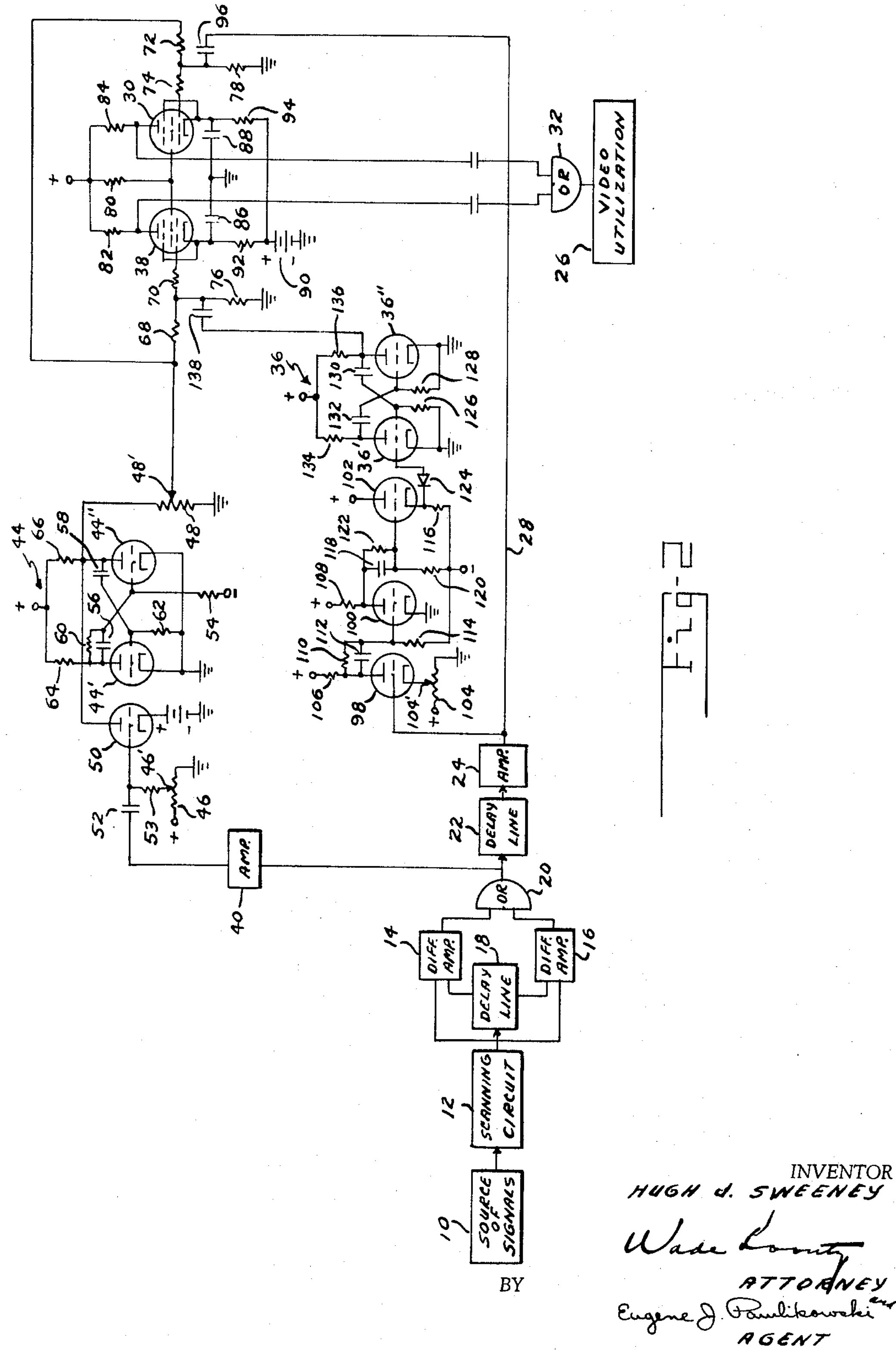
FIG. 2 is a detailed schematic diagram showing the specific details of certain units shown in the system of FIG. 1.

Reference is now made to FIG. 2, which shows a schematic diagram of a gradient display system according to one form of the invention. The specific circuit arrangement of FIG. 2 is essentially the same as the general arrangement of FIG. 1, and the various elements of FIG. 2 will be seen to correspond identically to similarly referenced elements shown in FIG. 1.

In FIG. 2, amplifier 40 is connected to the grid of a triode amplifier 50 by means of a capacitor 52. The grid of amplifier 50 is returned through a resistor 53 to wiper arm 46' of bias resistor 46.

Monostable MVB 44 includes two triode amplifiers 44' and 44''. In the form shown, amplifier 44'' has the grid resistor 54 thereof returned to a unidirectional negative potential herein designated (—). Thus, the stable state for each amplifier is the one for which amplifier 44'' is conducting and amplifier 44' is cutoff. Capacitor coupling is used involving capacitors 56 and 58. A resistor 60 gives direct coupling from amplifier 44' to amplifier 44''. The grid resistor 62 of amplifier 44' is returned to ground. Likewise, the cathodes are grounded. Load resistors 64 and 66 couple the plates of amplifiers 44' and 44'' respectively, to a source of unidirectional voltage indicated (+).

The plate of amplifier 50 is directly connected to the plate of amplifier 44'' so that variations in the plate voltage of amplifier 50 are capacitively coupled to the grid of amplifier 44'. In this way, a negative trigger pulse applied to the grid of amplifier 44' will reverse the initial conditions established in MVB 44.

The plate of amplifier 44'' of MVB 44 is connected to one end of variable resistor 48, the opposite end of which is grounded. Resistor 48 and load resistor 66 of amplifier 44'' comprise a voltage divider network for establishing a unidirectional voltage variable bias supply for pulse driver amplifiers 30 and 38, shown herein as pentodes. The wiper arm 48' of resistor 48 connects to the grid of amplifier 38 through series-connected resistors 68 and 70, and also is connected to the grid of amplifier 30 through series-connected resistors 72 and 74, Grid resistors 70 and 74 of amplifiers 38 and 30, respectively, are returned to ground through resistors 76 and 78, respectively. Screen grid potential is provided through a resistor 80. Load resistors 82 and 84 couple the plates of amplifiers 38 and 30, respectively, to a unidirectional source indicated (+). Bypass capacitors 86 and 88 connect the cathodes of amplifiers 30 and 38 to ground. A fixed bias supply shown herein as a battery 90 having its negative terminal grounded is connected to the cathodes of amplifiers 38 and 30 by resistors 92 and 94, respectively.

It will be observed that the polarity connections of battery 90 are such as to oppose the flow of plate current in pulse driver amplifiers 30 and 38. In the quiescent state, the pulse driver amplifiers are reverse biased to cutoff by proper selection of the potential of battery 90.

In the detailed embodiment of FIG. 2, the plates of amplifiers 30 and 38 are capacitively connected directly to OR function gate 32, from whence a connection is made to video utilization means 26. Pulse driver amplifier 30 receives the contrast gradient signal at the grid thereof through a capacitor 96 coupled to the output of amplifier 24 by line 28.

As previously explained, the gradient signal output of amplifier 24 is applied to an astable MVB 36. In the particular construction shown, MVB 36 is preceded in the aforesaid upper path by amplifiers 98 and 100 and a cathode follower amplifier 102. A variable bias resistor 104 having one end thereof connected to a unidirectional potential indicated (+) and the other end grounded is connected to the cathode of amplifier 98. Load resistors 106 and 108 connect the plates of amplifiers 98 and 100, respectively, to a unidirectional potential indicated (+). In the usual manner, the plate of amplifier 102 connects directly to the positive (+) source. Parallel connected resistor 110 and capacitor 112 interconnect the plate of amplifier 98 and the grid of amplifier 100. The grid of amplifier 100 and the cathode of amplifier 102 are returned through resistors 114 and 116, respectively, to a unidirectional negative potential indicated (−). The plate of amplifier 100 is connected to the negative potential (−) through a series-connected arrangement comprising capacitor 118 and resistor 120, with capacitor 118 being paralleled by a resistor 122.

The cathode of amplifier 102 is coupled to amplifier 36′ of MVB 36 through a diode 124. As seen, MVB 36 includes two RC-coupled triode amplifiers 36′ and 36″ having grid resistors 126 and 128, respectively, associated with capacitors 130 and 132. The cathodes thereof are directly grounded. Plate voltage is supplied from a unidirectional positive source indicated (+) through load resistors 134 and 136. The plate of amplifier 36″ is coupled by means of a capacitor 138 to the grid circuit of pulse driver amplifier 38 through resistor 70.

OPERATION

For purposes of illustration, it will be assumed that the source of signals 10 and the scanning circuit 12 together make a pickup device which may, for example, be a television camera tube. Accordingly, for the illustration adopted, the information contained in images under study will be stored in the form of a charge image. The scanning beam in scanning circuit 12 periodically releases the charge from each picture element and brings it to an equilibrium. Each change in charge in each element induces a current pulse in the signal lead represented herein by the output lead of scanning circuit 12. The train of electrical impulses so generated constitutes the brightness distribution of the picture.

In the delay line 18, the video signals corresponding to the picture undergo a delay. A variable delay of 2–7 $\mu$sec. is considered a satisfactory interval over which adjustments can be made. Delay line 18, therefore, acts as a storage device which holds the video information taken from one picture element for amplitude comparison with the video signal emerging as the next picture element is traversed by the scanning beam. Once in differential amplifiers 14 and 16, the delayed and undelayed video signals emerge as a single output so long as their amplitudes differ.

As an illustration of the operation of the differential amplifiers in the illustrated embodiment, assume that during one interval in time the video signals fed to delay line 18 and to the differential amplifiers 14 and 16 represent a scene illuminated at a relatively low level. The resulting video signal will be considered to have a corresponding low value. Then, assume that at some point just later in time the beam shifts sharply to a scene of much greater brightness. Consequently, it may be expected that a video signal of greater amplitude will result. Such a pattern may be imagined to exist as two superposed concentric disks, the inner of which is considerably more reflective than the outer one which surrounds it. For the conditions stated, substantially at the moment the scanning beam moves from the darker area into the brighter area the amplitude of the undelayed video signal will become greater than the amplitude of the delayed video signal immediately preceding it. Accordingly, where the undelayed video signal exceeds the delayed signal in amplitude, it will be assumed that differential amplifier 14 produces a positive signal proportional to the contrast gradient at the spot where the beam progresses from the darker to the lighter portion.

The converse also holds true. Thus, let it be assumed that during the interval of time taken by the beam to traverse the lighter portion in the center of the pattern, the light intensity is high and therefore the electrical output of the scanning circuit is at a high level. As the scanning beam is swept into the darker area the light intensity becomes lower and the electrical output of the scanning circuit falls to a similarly low level. Since a finite time is involved in the transition of the beam from the brighter to the darker area, the delayed signal now becomes the one which has a greater value than the undelayed signal.

For these reasons, it will be understood that from the video signals produced in the transition from light to dark, differential amplifier 16 now produces a positive-going output signal representing the contour outline of the picture. Therefore, it will be appreciated that regardless of the direction in which the intensity of the picture changes, either from dark to bright, or vice versa, the present invention supplies to OR function gate 20 a video signal referenced in the positive direction.

Accordingly, the output of OR function gate 20 is a negative-going contrast gradient signal which is delayed again in delay line 22 and amplified in amplifier 24 with a polarity inversion. The positive video signal is applied to line 28 and then is impressed on the grid of pulse drive amplifier 30. In delay line 22, a delay on the order of 2 $\mu$sec. has proven satisfactory. Simultaneously, the output signal of OR function gate 20 is inverted by amplifier 40 and, by means of capacitor 52, is fed to the grid of amplifier 50. Let it be assumed that wiper arm 46′ of resistor 46 is adjusted to bias the grid of amplifier 50 in the cutoff region. Further, let it be assumed that the positive-going signal at the grid of amplifier 50 is too low to raise the grid thereof above the cutoff voltage. With amplifier 50 nonconducting, the plate voltage thereof remains substantially at the potential of unidirectional source (+). Since the one end of resistor 48′ is connected to the plate of amplifier 44″, its wiper voltage will be at a high positive value. This considerably reduces the grid-to-cathode bias of pulse driver amplifiers 30 and 38. In other words, with MVB 44 in its stable state, the pulse driver amplifiers are less heavily biased against conduction. When the video signal applied to the grids of amplifiers 30 and 38 is great enough to overcome the negative bias, the resulting drop in plate voltage results in a signal acting on video utilization 26 which represents the instantaneous contrast gradient.

The operation of the invention as presented to this point may better be understood by reference to FIG. 3. Consider this pattern as a model to be scanned at the input end of the system of FIG. 2. It consists of a gray square inscribed on a black circle placed over a white background. Three forms of gradient presentations, those illustrated in FIGS. 4, 5, and 6, are possible depending on the settings of the wiper arms of resistors 46 and 48. It first must be understood that scanning the pattern of FIG. 3 in the manner described hereinabove will produce negative video signals at the output of OR function gate 20 according to the contrast gradients existing between areas of different brightness. Moreover, the conventional television sweep which scans only along the horizontal axis will be assumed so that the pattern will be swept periodically substantially horizontally over its entire surface.

The gradient display of FIG. 4 is obtained by adjusting the cutoff level of amplifier 50 so as to pass no input pulses, and by adjusting the grid voltage to pulse driver amplifiers 30 and 38 to a low reverse bias. Accordingly, amplifier 50 is made heavily biased against conduction by moving the wiper arm of resistor 46 toward the ground terminal. When the video signals are applied to the grid of amplifier 50, conduction cannot occur and the voltage at the wiper arm of resistor 48 stays at some positive value. Now, the grid bias voltage of pulse driver amplifiers 30 and 38 likewise remains high and creates a bias condition established near the cutoff level. Therefore, all video signals from the pattern of FIG. 3 which reach the grid of pulse driver amplifier 30 will be effective to raise the grid voltage above cutoff. In this way the inner and outer contour outlines corresponding to the changes in brightness in the pattern of FIG. 3 appear in the reproduction obtained from video utilization means 26.

If, now, no or little change is made in the setting of wiper arm 46′ of resistor 46, and wiper arm 48′ of resistor 48 is adjusted in the direction of the ground terminal so as to increase the reverse bias on pulse driver amplifier 30, the video information obtained from video utilization means 26 is the outer outline of FIG. 5. With the grid of amplifier 30 now less positive than its cathode, only video signals corresponding to sharply defined contrast gradients can raise the grid voltage of amplifier 30 above cutoff. Accordingly, the circular contrast gradient will appear in the video reproduction but the signals corresponding to the inner contrast gradient will have no effect through inability to overcome the bias holding pulse driver amplifier 30 cutoff.

The video pattern of FIG. 6 is readily obtained by raising the level of the positive voltage at wiper arm 46' of resistor 46. This reduces the effective grid bias of amplifier 50. For this adjustment the video signals corresponding to the contrast gradient of the white background and the black circle, being greater than the video signals characterizing the contrast gradient at the junction of the black circle and the gray square, will place amplifier 30 in conduction. The negative-going voltage now at the plate of amplifier 50 is coupled to the grid of amplifier 44' and, in a known manner, it will reverse the condition of MVB 44. The resulting higher negative voltage at the grid of pulse driver amplifier 30 effectively increases its reverse bias so that, when the video signal from amplifier 24 is applied to amplifier 30, amplifier 30 is inhibited. The purpose of delay line 22 is to slightly delay the video signal fed to pulse driver amplifier 30 in observance of the switching interval required in MVB 44 should the MVB be triggered into the state which inhibits amplifiers 30 and 38. The inhibiting action of MVB 44 results in the loss of the video signals by which the circular contrast gradient is represented. As will readily be realized, the relatively lower amplitude of the contrast gradient signals from the junction of the black and gray areas do not trigger MVB 44. When compared with the contrast gradient signals delimiting the black circle, these signals are too small to excite amplifier 50 to conduction.

It therefore can be seen that where a discernible contrast threshold exists between different areas of a pattern under examination, the amount of video information represented in the final output depends on the bias settings of the wiper arms of resistors 46 and 48 and therefore may be varied to selectively eliminate from visual consideration any silhouettes which are not of interest.

FIG. 7 is a letter character imaged on the pickup system represented by source of signals 10 and scanning circuit 12. FIG. 8 is a picture taken from the face of a cathode-ray tube, embodied, for example, in video utilization means 26, when scanning the letter character of FIG. 7 along the horizontal axis. The gradient information supplied by the present invention, the reproduced silhouette of the letter character of FIG. 7 being an example, lends itself readily to automatic digital techniques in pattern recognition. In a family of limited patterns, such as the letters of the alphabet, it is possible to select several regularly occurring scanning lines of gradient information to identify individual letters. For example, the identification can be based on the number of or the spacing between intension pulses on selected scanning lines, or on the location of member crossings in the letter. As may be supposed, alternate horizontal and vertical scanning would further reduce the data and processing steps required to identify reliably therefrom characters by means of the gradient information.

Moreover, since picture detail is reduced considerably in the gradient transformation, so also is the coding problem. A picture may be transformed to a binary configuration in which a "1" indicates a change in detected radiation and a "0" indicates no change. Simplifications are therefore effected in video transmission. A picture may be telemetered from a distance location as a binary number and reconstructed in silhouette outline at a receiving site.

The waveforms of FIG. 9 further shows how adjustments of the wiper arms of resistors 46 and 48 affect the final video information presented to video utilization means 26. FIG. 9A represents a train of video signals at the output of scanning circuit 12. FIG. 9B represents the same signal train delayed by the action of delay line 18. The differential processes occurring in amplifiers 14 and 16 are recorded in FIGS. 9C and 9D, respectively. Each of the signals of waveforms 9C and 9D gates the OR function gate 20. The amplified and inverted video signals which appear at the outputs of amplifiers 40 and 24 are shown in FIGS. 9E and 9F, respectively. The signal made available to video utilization means 26 from the conditions assumed is shown in FIG. 9G. In FIG. 9E, the effective bias level set by adjustment of wiper arm 46' of resistor 46 is represented by the horizontal dashed line 140. Those video signals from amplifier 40 whose peaks extend above the cutoff level 140 will cause amplifier 50 to conduct. As recalled, this action inhibits the pulse driver amplifiers 30 and 38.

The effective bias level established by resistor 48' is represented in FIG. 9F by the horizontal dashed line 142. Viedo signals from amplifier 24 which exceed the bias level 142 will cause pulse driver amplifier 30 to conduct in the absence of an inhibiting voltage from MVB 44 and thereby will actuate video means 26. Accordingly, considering the pulse train shown in FIG. 9E, the pulse driver amplifiers will be inhibited by those pulses which exceed the cutoff level 140 as set by resistor 46. In the manner described hereinabove, the corresponding delayed video signals of FIG. 9F will fail to drive pulse driver amplifier 30 into conduction. On the other hand, since the two center signals shown in FIG. 9E emerging from amplifier 40 are incapable of triggering MVB 44, and the delayed counterparts of these two signals have sufficient amplitude to nullify the effective bias voltage set by the wiper arm of resistor 48, these two signals only will give rise to an output signal produced by video utilization means 26.

Referring again to FIG. 2, with no signal applied to the grid of amplifier 98 the wiper arm 104' of resistor 104 is so positioned that amplifier 98 is initially cut off. The division of voltage among resistors 106, 110, and 114 is such that the grid of amplifier 100 is substantially at ground potential. The cathode of amplifier 102 is thus set negatively which biases diode 124 in the forward direction. A negative voltage therefore is placed on the grid of amplifier 36' of MVB 36. This checks any regenerative action in MVB 36 and places the plate of amplifier 36" effectively at ground potential.

The action of amplifiers 98, 100 and 102 and MVB 36 may be explained by first examining the effect of video signals corresponding to sharply defined contrast gradients and then considering the effect of video signals derived at times when the detected radiation varies gradually. In the latter case would be a pattern in which radiation in the visible region varies uniformly from a light gray to a darker shade of gray approaching black, or vice versa.

When a sharply rising positive-going signal from the output of amplifier 24 is applied to the grid of amplifier 98, the grid voltage rises above cutoff and momentarily causes a sudden resultant increase in the plate current of amplifier 98. This causes the plate voltage of amplifier 98 to drop, and this, in turn, causes the grid voltage of amplifier 100 to drop. The change in grid voltage of amplifier 100 quickly drives the plate voltage in the positive direction which, in turn, increases positively the grid voltage of amplifier 102. Since the cathode of amplifier 102 follows the grid potential, diode 124 becomes reverse-biased which isolates the grid of amplifier 36' of MVB 36 from the negative bias potential. Ordinarily, the removal of the negative grid bias of amplifier 36' would trigger MVB 36 into the relaxation cycle. However, since each video signal from sharply defined contrast gradients has such a relatively short duration, the bias on the grid of amplifier 36' will be removed only momentarily so that the negative bias through diode 124 will instantly be reapplied. Accordingly, MVB 36 will remain relatively unaffected by short, transient signals and will normally remain in the stable state. For such signals, the path to the grid of pulse driver amplifier 38 through MVB 36 is effectively closed so that the steep, transient video signals from amplifier 24 are translated to a gradient display through pulse drive amplifier 30, in the manner previously described. After each transient interval, amplifiers 98, 100, and 102 return to their normal quiescent states.

If, now, the image scanned is gradually variant in brightness in the sense that the resulting pulse length from amplifier 24 corresponds to the duration of the gradual change in detected radiation, the voltage on the grid of amplifier 98 will rise above cutoff, as shown in FIG. 10A. For purposes of illustration, a pattern so varying in brightness may consist of a circular disc whose surface gradually changes from light gray at the edge to black concentric at the center. The cutoff level as set by the arm of resistor 104 is designated by the reference character 144. With the resulting increase in plate current of amplifier 98 the grid voltage of amplifier 100 drops negatively, as shown in FIG. 9B. As the plate voltage of amplifier 100 rises, a corresponding increase in the positive direction is seen at the grid and, hence, the cathode of amplifier 102. In the construction shown, the cathode voltage of amplifier 102 reaches substantially ground potential at this time. This change is seen in FIG. 9C and is effective to open the biasing connection established through diode 124. Regenerative action will begin in MVB 36 which allows it to be free running, thus giving a relaxation cycle over the time the cutoff level 144 in amplifier 98 is exceeded. The periods of rapid change in MVB 36, separated by relatively long relaxation periods, result substantially in the waveforms shown in FIG. 9D. Depending on the bias setting of resistor 48, these signals cause pulse driver amplifier 38 to generate a string of pulses and to apply such transients to video means 26 through OR function gate 32.

It will be apparent to one skilled in the art that, from the particular foregoing description concerning MVB 36 and the preceding three amplifiers 98, 100, and 102, the continuous pulse train over the period of gradually changing contrast can be handled by established techniques currently in use, such as the beam control of a CRT, to display the function of brightness distinctions not clearly marked in separate stages.

Summarizing briefly, the invention system of comparing a present picture element with a past picture element with a view toward detecting gradual or sharp changes in radiation is essentially to use a floating bias. The criteria for generating an intensity pulse is a difference in detected radiation between two picture elements, using the amplitude of the past picture element as the reference. Since the reference, or bias, can vary between minimum and maximum values, essentially a floating bias is maintained with the instantaneous value set by a designated past picture element. By this technique minute changes at relatively low levels of radiation are detected and displayed as readily as minute changes at higher levels of radiation. In effect, by the invention system a pattern can be detected against a background setting of varying intensity with no loss of significant contrast information and without introducing the extraneous background signals which normally accompany a low threshold setting.

Although only one embodiment of the invention has been illustrated and described, it will be apparent to those skilled in the art that various changes and modifications may be made therein without departing from the spirit of the invention or the scope of the appended claims.

I claim:

1. Apparatus for registering a silhouette of an image in which distinct brightness differences predominate comprising means scanning said image for producing a train of video signals representing the instantaneous brightness of the segments scanned, two differential amplifier means each having two input terminals, means for applying said video signals to one input terminal of each of said differential amplifier means, delay means coupled to said scanning means for delaying said video signals a predetermined time and passing the delayed output signal thereof to the other input terminal of each of said differential amplifier means, said differential amplifiers having such characteristics as to produce a difference output signal of one polarity when the amplitude of said delayed output signal is greater than the video signal representing the instantaneous brightness of the segment scanned and to produce a difference output signal of the same polarity when the amplitude of said delayed output signal is less than the video signal representing the instantaneous brightness of the segment scanned, and means receiving said difference output signal for reproducing in silhouette form the particular brightness levels of said image.

2. Apparatus for registering a silhouette of an image in which distinct brightness difference predominate comprising: means for continuously generating a video control signal in accordance with the amplitude difference between each picture element and the immediately preceding picture element of said scene, a monostable multivibrator set initially to produce a relatively high positive output voltage, means coupling said video control signal to said multivibrator for at times switching said multivibrator to its alternate state wherein the output voltage thereof becomes considerably less than said high positive output voltage, biasing means coupled to said multivibrator for establishing a bias level with respect to said video control signals so that for video control signals exceeding said bias level said multivibrator is switched to said alternate state, amplifier means for amplifying each video control signal which is above a predetermined amplitude, video utilization means for converting the output signal of said amplifying means to a video picture representative of the distinct brightness differences of said image, and means connecting the output voltage of said multivibrator to said amplifying means in conduction controlling relation and inhibiting said amplifying means against producing an output signal when said multivibrator is in said alternate state.

3. The system according to claim 2 including a delay means of predetermined delay inserted between said video control signal generating means and said amplifier means.

4. Apparatus for registering a silhouette of an image in which distinct brightness differences predominate comprising: scanning means for generating electrical signals representative of said image, two differential amplifier means each having an output terminal and two input terminals, each of said differential amplifiers having one input terminal thereof receiving said signals, delay means inserted between said scanning means and the other input terminal of each of said differential amplifier means and having a preselected delay, said differential amplifiers having such characteristics as to produce a difference signal of one polarity at one of said output terminals at times when the amplitude of the delayed electrical signal is greater than the amplitude of the undelayed electrical signal and to produce a difference signal of the same polarity at the other of said output terminals at times when the amplitude of said delayed electrical signal is less than the amplitude of the undelayed electrical signal, an OR gate coupled to the output terminals of said differential amplifier means and having an OR function output terminal, multivibrator means having input and output terminals and set initially to produce an output voltage of predetermined value, means inserted between the output terminal of said OR gate and the input terminal of said multivibrator means for at times switching said multivibrator means to its alternate state in which the output voltage thereof changes from said predetermined value, biasing means for adjusting the switching point of said multivibrator means with respect to said electrical signals, other delay means of preselected delay in accordance with the switching time of said multivibrator means coupled to the output terminal of said OR gate, amplifier means receiving delayed signals from said other delay means for amplifying the delayed signals which are above a preselected amplitude, video utilization means for converting amplified signals passing through said amplifier means to a video picture representative of distinct brightness differences of said image, and means connecting said output terminal of said multivibrator means to said amplifier means in conduction controlling relation for inhibiting said amplifying means against producing an output signal as long as said multivibrator means is in its alternate state.

5. A system for reproducing signal information registered initially as electrical signals indicating the degree of brightness of adjacent picture areas of a physical image comprising: an image, scanning means for generating said electrical signals from said image, a delay means for introducing a time delay in the passage of said signals, subtraction means for continuously subtracting each of said delayed signals from the electrical signal next to be delayed thereby to obtain a difference signal each time the amplitudes of said signals differ, an astable multivibrator set initially to a nonregenerative condition, means inserted between said subtraction means and said multivibrator and biased for switching said multivibrator to an oscillatory mode during gradual variations in contrast over the face of said image, amplifier means for amplifying the oscillatory pulses from said multivibrator provided said pulses exceed a preselected amplitude, and video utlization means receiving the amplified output of said amplifier means.

6. A system for reproducing signal information in accordance with the contrast pattern of an image comprising: scanning means for periodically generating electrical signals in accordance with the instantaneous brightness of segments along a single axis of said scene, a delay line for introducing a time delay in the passage of said signals, two differential amplifiers each having an output terminal and two input terminals, each of said differential amplifiers having one input terminal thereof receiving said signals, means for coupling the delayed signals to the other input terminal of each of said differential amplifiers, an OR gate having double-ended inputs from the output terminals of said differential amplifiers, said differential amplifiers having such characteristics as to produce a differential signal of one polarity at the input of said OR gate at times when the amplitude of the delayed signal is greater than the amplitude of the undelayed signal and to produce a difference signal of the same polarity at the input of said OR gate at times when the amplitude of said delayed signal is less than the amplitude of the undelayed signal, a second delay line of preselected delay coupled to the output terminal of said OR gate, a pulse driver amplifier capacitively coupled to said second delay line and normally biased in a nonconducting condition, an astable multivibrator set initially to a nonregenerative condition, means inserted between the output terminal of said second delay line and said multivibrator and biased for switching said multivibrator to an oscillatory mode provided a gradual increase occurs in the amplitude of successive difference signals passed through said OR gate, a second pulse driver amplifier coupled capactively to the output of said multivibrator and normally biased in a nonconducting condition, means operatively connected with said pulse driver amplifiers for establishing a reference potential with respect to the level of the output of said second delay line and with respect to the oscillatory output of said multivibrator, a video utilization device, OR gate means for applying the output signals of said pulse driver amplifier to said video utilization device, monostable multivibrator means having input and output terminals and set initially to supply an output voltage of predetermined value, means inserted between the output terminal of said OR gate and the input terminal of said monostable multivibrator means for at times switching said monostable multivibrator means to its alternate state thereby changing the output voltage thereof from said predetermined value, and means connecting the output terminal of said monostable multivibrator means to said pulse driver amplifiers in conduction controlling relation to thereby inhibit said pulse driver amplifiers against conduction as long as said monostable multivibrator means is in its alternate state.

References Cited

UNITED STATES PATENTS

| | | | |
|---|---|---|---|
| 2,445,041 | 7/1948 | Scholz | 178—6.6 |
| 3,011,018 | 11/1961 | Sullivan | 178—6 |
| 3,017,456 | 1/1962 | Schreiber | 178—6 |
| 3,091,738 | 5/1963 | Relis | 328—146 |
| 3,294,896 | 12/1966 | Young | 178—7.1 |
| 3,303,493 | 2/1967 | Charbonnier | 328—146 |

JOHN W. CALDWELL, *Primary Examiner.*

J. A. ORSINO, *Assistant Examiner.*